United States Patent Office 3,458,318
Patented July 29, 1969

3,458,318
SUPERSENSITIZED SILVER HALIDE EMULSIONS
Dugald A. Brooks, Rochester, N.Y., assignor to Eastman Kodak Company, Rochester, N.Y., a corporation of New Jersey
No Drawing. Filed Aug. 2, 1965, Ser. No. 476,658
Int. Cl. G03c 1/28, 1/10
U.S. Cl. 96—104                                    19 Claims

ABSTRACT OF THE DISCLOSURE

Photographic layers containing silver halide bearing:
(1) A cyanine dye having a conjugated chain containing at least three atoms in the chain selected from carbon and nitrogen such that not more than one of said atoms in the chain is nitrogen, or the base from which the said cyanine dye is derived, and
(2) A substituted thiourea in which at least one of the hydrogen atoms on each nitrogen atom of the thiourea molecule is replaced by a 1 to 8 carbon atom hydrocarbon substituent and at least one of the substituents on the said molecule contains an aromatic ring are supersensitized to light in the minus blue or red region of the spectrum and are used advantageously in photography.

This invention is concerned with photography, and more particularly to photographic silver halide containing novel supersensitizing combinations.

It is known in the art of making photographic emulsions that certain dyes of the cyanine class alter the sensitivity of photographic emulsions of the gelatino-silver halide kind, when the dyes are incorporated in the emulsion. It is also known that the sensitization produced by a given dye varies somewhat with the type of emulsion in which the dye is incorporated. Furthermore, the sensitization of a given emulsion by a given dye may be altered by varying the conditions in the emulsion. For example, the sensitization may be increased by increasing the silver ion concentration or decreasing the hydrogen ion concentration (i.e., increasing the alkalinity) or both. Thus, sensitization can be increased by bathing plates coated with a spectrally sensitized emulsion, in water or in aqueous solutions of ammonia. Such a means of altering the sensitivity of a sensitized emulsion by increasing the silver ion concentration and/or by decreasing the hydrogen ion concentration is commonly called "hypersensitization." Hypersensitized emulsions have generally poor keeping qualities.

I have now found another means of altering the sensitivity in photographic emulsions containing certain cyanine dyes including complex cyanine, dicarbocyanine, tricarbocyanine and certain azacyanine dyes. Since the conditions in the emulsions, i.e., the hydrogen ion and/or the silver ion concentration, undergo little or no change in my method, I shall designate my method as a kind of supersensitization.

It is therefore, an object of my invention to provide novel photographic layers containing silver halide with a cyanine dye having at least 3 carbon atoms or at least 2 carbon atoms and one nitrogen atom in the conjugated chain, said dye being supersensitized with certain substituted thioureas.

Another object is to provide photographic hydrophilic colloid silver halide emulsions containing a supersensitizing combination of a complex cyanine or an azacyanine dye with certain substituted thioureas.

Another object is to provide photographic hydrophilic colloid silver halide emulsions containing a supersensitizing combination of a carbocyanine, a dicarbocyanine or tricarbocyanine dye with certain substituted thioureas.

Another object is to provide methods for making these supersensitized emulsions.

Still further objects will become evident from a consideration of the following specification and claims.

These and other objects are accomplished according to my invention by the use of photographic layers containing silver halide bearing a:
(1) Cyanine dye having a conjugated chain containing at least three atoms in the chain selected from carbon and nitrogen such that not more than one of said atoms in the chain is nitrogen or the base from which the said cyanine dye is derived, and
(2) A substituted thiourea in which at least one of the hydrogen atoms on each nitrogen atom of the thiourea molecule is replaced by a 1 to 8 carbon atom hydrocarbon substituent and at least one of the substituents on the said molecule contains an aromatic ring.

The cyanine dyes used to advantage according to my invention include those represented by Formula I:

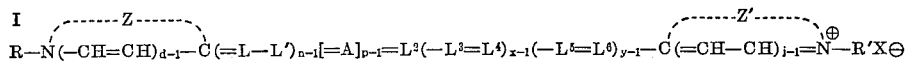

I    R—N(—CH=CH)$_{d-1}$—C(=L—L')$_{n-1}$[=A]$_{p-1}$=L$^2$(—L$^3$=L$^4$)$_{x-1}$(—L$^5$=L$^6$)$_{y-1}$—C(=CH—CH)$_{j-1}$=N—R'X$^\ominus$ wherein R and R' each represents the same or a different alkyl group substituted or not, such as, methyl, ethyl, propyl, butyl, an alkoxyalkyl (e.g., methoxyethyl, ethoxyethyl, methoxypropyl, etc.), a chloroalkyl (e.g., 2-chloroethyl, 2 - chloropropyl, 3 - chloropropyl, 4 - chlorobutyl, etc.), a hydroxyalkyl (e.g., 2-hydroxyethyl, 3-hydroxypropyl, 4-hydroxybutyl, etc.), a sulfoalkyl (e.g., 2-sulfoethyl, 3-sulfopropyl, 4-sulfobutyl, etc.), a carboxyalkyl (e.g., carboxymethyl, 2 - carboxyethyl, 4 - carboxybutyl, etc.); Z and Z' each represents the non-metallic atoms necessary to complete a nucleus containing a heterocyclic ring having from 5 to 6 atoms in the heterocyclic ring, in which the hetero atoms are typically nitrogen, sulfur, oxygen, selenium, etc., and the nuclei are typically a thiazole nucleus (e.g., thiazole, 4 - methylthiazole, 5 - methylthiazole, 4-phenylthiazole, 5-phenylthiazole, 4,5-dimethylthiazole, 4,5 - diphenylthiazole, 4 - (2 - thienyl) thiazole, etc.), a benzothiazole nucleus (e.g., benzothiazole, 4 - chlorobenzothiazole, 5 - chlorobenzothiazole, 6 - chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5 - phenylbenzothiazole, 4 - methoxybenzothiazole, 5-methoxybenzothiazole, 6-methoxybenzothiazole, 5-iodobenzothiazole, 6-iodobenzothiazole, 4-ethoxybenzothiazole, 5-ethoxybenothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), a naphthothiazole nucleus (e.g., naphtho[2,1-d]thiazole, naphtho[1,2-d]thiazole, 5-methoxynaphtho[1,2-d]thiazole, 5-ethoxynaphtho[1,2-d]thiazole, 7-methoxynaphtho[2,1-d]thiazole, 8-methoxynaphtho[1,2-d]thiazole, 6,7,8,9-tetrahydronaphthothiazole, etc.), an oxazole nucleus (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), a benzoxazole nucleus (e.g., benzoxazole, 5-chlorobenzoxazole, 5-phenylbenzoxazole, 5-methylbenzoxazole, 6-methylbenzoxazole, 5,6-dimethylbenzoxazole, 4,6-dimethylbenzoxazole, 5-methoxybenzoxazole, 6-methoxybenzoxazole, 5-ethoxybenzoxazole, 6-chlorobenzoxazole, 5-hydroxybenzoxazole, 6-hydroxybenzoxazole, etc.), a naphthoxazole nucleus (e.g., naphth[2,1-d]oxazole, naphth[1,2-d]oxazole, etc.), a selenazole nucleus (e.g., 4-methylselenazole, 4-phenylselenazole, etc.), a benzoselenazole nucleus (e.g., benzoselenazole, 5-chlorobenzoselenazole, 5-methoxybenzoselenazole, 5-hydroxybenzoselenazole, tetrahydrobenzoselenazole, etc.), a naphthoselenazole nucleus (e.g., naphtho[2,1-d]selenazole, a thiazoline nucleus (e.g., thiazoline, 4-methylthiazoline, etc.), a 2-quinoline nucleus (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), a 4-quinoline nucleus (e.g., quinoline, 6-methoxyquinoline, 7-methylquinoline, 8-methylquinoline, etc.), a 1-isoquinoline nucleus (e.g., isoquinoline, 3,4-dihydroisoquinoline, etc.), a 3,3-dialkyl-3H-indole nucleus (e.g., 3,3-dimethyl-3H-indole, 3,3,5-trimethyl-3H-indole, 3,3,7-trimethyl-3H-indole, etc.), a 2-pyridine nucleus (e.g., pyridine, 3-methylpyridine, 4-methylpyridine, 5-methylpyridine, 6-methylpyridine, 3,4-dimethylpyridine, 3,5-dimethylpyridine, 3,6-dimethylpyridine, 4,5-dimethylpyridine, 4,6-dimethylpyridine, 4-chloropyridine, 5-chloropyridine, 6-chloropyridine, 3-hydroxypyridine, 4-hydroxypyridine, 5-hydroxypyridine, 6-hydroxypyridine, 3-phenylpyridine, 4-phenylpyridine, 6-phenylpyridine, etc.), a 4-pyridine nucleus (e.g., 2-methylpyridine, 3-methylpyridine, 2-chloropyridine, 3-chloropyridine, 2,3-dimethylpyridine, 2,5-dimethylpyridine, 2,6-dimethylpyridine, 2-hydroxypyridine, 3-hydroxypyridine, etc.), a 1-substituted imidazole nucleus (e.g., 1-ethylimidazole, 1-ethyl-4-phenylimidazole, 1,4-dimethylimidazole, 4-methyl-1-phenylimidazole, etc.), a 1-substituted benzimidazole nucleus (e.g., 1-ethylbenzimidazole, 1-butylbenzimidazole, 1-ethyl-4,5-dichlorobenzimidazole, etc.), a 1-substituted naphthimidazole nucleus (e.g., 1-methyl-1H-naphth[1,2-d]imidazole, 1-ethyl-1H-naphth[1,2-d]imidazole, 1-butyl-3H-naphth[1,2-d]imidazole, 6-chloro-1-methyl-1H-naphth[1,2-d]imidazole, etc.), a tetrazole nucleus, etc.; A represents the non-metallic atoms necessary to form a cyclic nucleus such as, 6-methyl-2-methylene-4H-pyran-4-ylidene, a thiazolidinone nucleus (e.g., 4-thiazolidinone, 3-ethyl-4-thiazolidinone, 3-phenyl-4-thiazolidinone, naphthyl-4-thiazolidinone, etc.), a 4-imidazolidinone nucleus (e.g., 1-phenyl-4-imidazolidinone, 1-ethyl-4-imidazolidinone, 1-butyl-4-imidazolidinone, etc.), a 2-imidazolin-4-one nucleus (e.g., 1-phenyl-2-imidazolin-4-one, 1-ethyl-2-imidazolin-4-one, 1-butyl-2-imidazolin-4-one, etc.), 1,3-dithiolan-4-one, imidazo[1,2-α]-pyridin-2(3H)-one, and a 4-oxazolidinone nucleus (e.g., 4-oxazolidinone, 3-ethyl-4-oxazolidinone, etc.); L, $L^2$, $L^4$ and $L^6$ each represents a group selected from the class consisting of the nitrogen atom, a methine group (e.g., a =CH— group or a =CR$^2$— group) in which $R^2$ represents an alkyl group (e.g., methyl, ethyl, butyl, etc.), a phenoxy group (e.g., phenoxy, 4-methylphenoxy, etc.), and the cyano group, such that not more than one of the said L groups represents the nitrogen atom; $L^1$ and $L^5$ each represent the =CH— group; $L^3$ represents the =CH— group or the =CR$^3$— group where $R^3$ represents β-indolyl; d, p, x, y, and j each represent the same or different integer 1 or 2; n represents an integer 1, 2 or 3; and X⊖ represents an acid anion (e.g., chloride, bromide, iodide, perchlorate, sulfate, methlsulfate, ethylsulfate, p-toluenesulfonate, thiocyanate, etc.).

Representative dyes of Formula I include the following typical examples which form supersensitizing combinations with my substituted thioureas.

(1) 2-[(2-benzothiazolyl ethiodide)methylene]-3-β-methoxyethyl-5-[(1-methyl-2(1H)-naphtho[1,2-d]thiazolylidene-α-phenylethylidene]-4-thiazolidinone.

(2) 2-[(2-benzothiazolyl etho-p-toluenesulfonate)-methylene]-5-[(5-chloro-1,3-diethyl-2(3H)-benzimidazolylidene]ethylidene]-3-ethyl-4-thiazolidinone.

(3) 5-[(1,3-diethyl-2(3H)-benzimidazolylidene)ethylidene]-3-ethyl-2-](4-quinolyl ethiodide)methylene]-4-thiazolidinone.

(4) 2-[(2-benzoselenazolyl ethiodide)methylene]-3-ethyl-5-](3-ethyl-2(3H)-benzoselenazolylidene)-ethylidene]-4-thiazolidinone.

(5) 4-[(2-benzothiazolyl ethiodide)methylene]-2-[(3-ethyl-2(3H)-benzothiazolylidene)methyl]-6-methyl-4H-pyran.

(6) 4-[(2-benzothiozolyl ethiodide)methylene]-2-[3-(3-ethyl-2(3H)-benzothiazolylidene)propenyl]-6-methyl-4H-pyran.

(7) 2-[(2-benzothiazolyl ethiodide)methylene]-3-ethyl-5-[4-(3-ethyl-2(3H)-benzoxazolylidene)-2-butenylidene]-4-thiazolidinone.

(8) 2-[(2-benzothiazolyl ethiodide)methylene]-5-[3-ethyl-2(3H)-benzoxazolylidene)ethylidene]-1,3-dithiolan-4-one.

(9) 3-[(3-ethyl-2(3H)-benzothiazolylidene)ethylidene]-7-[3-(3-ethyl-2(3H)-benzothiozolylidene)propenyl]-imidazo-[1,2-a]-pyridin-2(3H)-one hydriodide.

(10) 3,3'-diethyloxatricarbocyanine iodide.

(11) 2-[(2-benzothiazolyl ethobromide)imino]-5-[(3-ethyl-2(3H)-benzothiazolylidene)ethylidene]-3-ethyl-4-thiazolidinone.

(12) 3-ethyl-5-[(3-ethyl-2(3H)-benzothiazolylidene)-ethylidene]-2-[4-phenyl-2-thiazolyl phenobromide)imino]-4-thiazolidinone.

(13) 5-[(3-ethyl-2-(3H)-benzoxazolylidene)ethylidene]-2-[3-(3-ethyl-2(3H)-benzoxazolylidene)propenyl]-1-phenyl-2-imidazolin-4-one.

(14) 5-[(3-ethyl-2(3H)-benzothiazolylidene)ethylidene]-2-[3-(3-ethyl-2(3H)-benzothiazolylidene)propenyl]-1-phenyl-2-imidazolin-4-one.

(15) 1-ethyl-5-[(3-ethyl-2(3H)-benzoxazolylidene)ethylidene]-2-[3-(3-ethyl-2(3H)-benzoxazolylidene)propenyl]-2-imidazolin-4-one hydriodide.

(16) 1-ethyl-5-[(3-ethyl-2(3H)-benzothiazolylidene)ethylidene]-2-[3-(3-ethyl-2(3H)-benzothiazolylidene)propenyl]-2-imidazolin-4-one hydriodide.

(17) 2-[(2-benzothiazolyl ethiodide)methylene]-5-{[1-(o-chlorophenyl)-4-ethyl-5(4H)-tetrazolylidene]ethylidene}3-ethyl-4-thiazolidinone.

(18) 2[(5-chloro-2-benzothiazolyl etho-p-toluenesulfonate)methylene]-5{[1-(o-chlorophenyl)-4-ethyl-5(4H)-tetrazolylidene]ethylidene}3-ethyl-4-thiazolidinone.

(19) 5{[1-(o-chlorophenyl)-4-ethyl-5(4H)-tetrazolylidene]ethylidene}3-ethyl-2-[(2-naphtho[1,2-d]-thiazoletho-p-toluenesulfonate)methylene]-4-thiazolidinone.

(20) 2-[3-(2-benzothiazolyl metho-p-toluenesulfonate)-2-β-indolylallylidene]-5{[1-(o-chlorophenyl)-4-ethyl-5(4H)-tetrazolylidene]ethylidene}-3-ethyl-4-thiazolidinone.

(21) 3,3'-diethyl-4,4'-dimethylthiazolodicarbocyanine iodide.

(22) 3,3'-diethyloxadicarbocyanine iodide.

(23) 3,3' - dimethyl - 8,12 - diphenoxyoxadicarbocyanine iodide.

(24) 3,3' - diethyl - 5,5' - diphenyloxadicarbocyanine perchlorate.

(25) 10-cyano - 3,3' - diethyloxadicarbocyanine iodide.

(26) 3,3'-diethyl-10-methyloxadicarbocyanine iodide.

(27) 3,3'-diethyl - 4,4',5,5' - tetraphenylthiazolodicarbocyanine iodide.

(28) 3,3'-diethyl - 4,5;4',5' - dibenzoseleneadicarbocyanine iodide.

(29) 3,3'-dimethyl - 4,5;4',5' - dibenzothiadicarbocyanine chloride.

(30) 3,3'-diethyl - 4,5;4',5' - dibenzothiadicarbocyanine iodide.

(31) 3,3'-diethylthia-10-azadicarbocyanine iodide.

(32) 3,3'-dimethylthia-8-azadicarbocyanine iodide.

(33) 1-p-chlorophenyl - 3',4 - diethyltetrazolothiadicarbocyanine iodide.

(34) 3,3'-dimethyl - 9,11 - trimethyleneselenadicarbocyanine bromide.

(35) 5,5',6,6'-tetrachloro - 1,1',3,3' - tetraethylbenzimidazolodicarbocyanine iodide.

(36) 3,3'-diethyloxathiadicarbocyanine iodide.

(37) 3,3' - di - β-hydroxyethylthiadicarbocyanine bromide.

(38) anhydro - 2 - [(2-benzothiazolyl ethohydroxide) methylene]-5-[(1 - ethyl - 2(1H) - quinolylidene)ethylidene]-3-(4-sulfobutyl)-4-thiazolidinone.

(39) anhydro - 2 - [(2-benzothiazolyl ethohydroxide) methylene] - 5 - [(3 - ethyl-2(3H)-benzothiazolylidene) ethylidene]-3-(4-sulfobutyl)-4-thiazolidinone.

(40) anhydro - 2 - [(2-benzothiazolyl ethohydroxide) methylene] - 5 - [(3 - ethyl-2(3H)-benzothiabolylidene) ethylidene]-3-(3-sulfobutyl)-4-thiazolidinone.

(41) anhydro-5,5'-diphenyl - 3,3' - di(4 - sulfobutyl) thiadicarbocyanine hydroxide.

(42) anhydro - 3 - ethyl-3'-(4-sulfobutyl)thiatricarbocyanine hydroxide.

(43) anhydro - 3 - ethyl-1'-(4-sulfobutyl)thia-4'-carbocyanine hydroxide.

(44) anhydro-3-ethyl-5-phenyl - 1' - (4 - sulfobutyl) thia-4'-carbocyanine hydroxide.

(45) 2-[(2-benzothiazolyl etho - p - toluenesulfonate)-methylene] - 5 - [(1,3 - diethyl-2(3H)-benzimidazolylidene)ethylidene]-3-ethyl-4-thiazolidinone.

(46) 3,3'-diphenylthiadicarbocyanine iodide.

(47) 3,3'-diphenylthiatricarbocyanine iodide.

(48) 2 - [(2 - benzothiazolyl ethiodide)methylene]-3-ethyl-5-[(3 - ethyl-2(3H)-benzoxazolylidene)ethylidene]-4-oxazolidinone.

(49) 2-[(2 - benzothiazolyl ethiodide)methylene]-3-ethyl-5-[(3 - ethyl - 2(3H) - benzothiazolylidene)-isopropylidene]-4-oxazolidinone.

(50) 2-[(3,3-dimethyl - 3H - indol-2-yl ethiodide)methylene]-3-ethyl-5-[(3-ethyl - 2(3H) - benzothiazolylidene)-ethylidene]-4-thiazolidinone.

(51) 2-[(2-benzothiazolyl ethiodide)methylene]-3-ethyl-5-[(1-ethyl - 3,3 - dimethyl-3H-indol-2(1H)-ylidene)-ethylidene]-4-thiazolidinone.

(52) 2-[5-(2 - benzothiazolyl ethiodide)-2,4-pentadienylidene]-1-ethyl-4([(3 - ethyl-2(3H)-benzoxazolylidene)-ethylidene]-3-phenylimidazolidin-5-one.

(53) 3,3'-diethylselenadicarbocyanine iodide.

The substituted thioureas used to advantage for supersensitizing the dyes of Formula I and the base from which the said dyes are derived, include those represented by the formula:

II

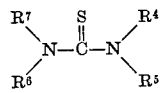

wherein $R^4$ and $R^6$ each represent the same or different member, such as, hydrogen, a lower alkyl group (e.g., methyl, ethyl, propyl, butyl, etc.), an aralkyl group (e.g., benzyl, methylbenzyl, phenethyl, etc.), an aryl group (e.g., phenyl, tolyl, ethylphenyl, etc.); and $R^5$ and $R^7$ each represents the same or a different group, such as, a lower alkyl group (e.g., methyl, ethyl, propyl, butyl, etc.), and an aryl group (e.g. phenyl, tolyl, ethylphenyl, etc.), such that at least one of the groups $R^4$, $R^5$, $R^6$ and $R^7$ contains an aryl ring.

Typical examples of my substituted thioureas used to advantage according to my invention include the following:

A—Tetrabenzylthiourea
B—N,N'-diethyl-N,N'-diphenylthiourea
C—N,N,N'-tribenzyl-N'-phenylthiourea
D—N,N'-dibenzyl-N,N'-diphenylthiourea
E—N,N-dibenzyl-N'-ethyl-N'-phenylthiourea
F—N-benzyl-N',N'-diethyl-N-phenylthiourea
G—N-ethyl-N,N',N'-triphenylthiourea
H—Tetraphenylthiourea
I—N-methyl-N'-phenethylthiourea
J—N,N-diethyl-N',N'-diphenylthiourea
K—N,N'-diphenyl-N,N'-ethylenethiourea My supersensitizing combinations are used to advantage to supersensitize photographic silver halide layers in which the silver halide forms the layer or in which silver halide grains are dispersed in a hydrophilic colloid binder such as, gelatin or any of the other binders used in photography including albumin, agar-agar, gum arabic, alginic acid, etc., and synthetic hydrophilic resins, e.g., polyvinyl alcohol, polyvinyl pyrrolidone, cellulose ethers, partially hydrolyzed cellulose acetate, etc. The silver halides used are silver bromide, silver bromoiodide, silver iodide, silver bromochlorobromide, silver chloride, silver chlorobromide, etc.

The following examples will still further illustrate my invention:

Example 1

A simple gelatino-silver bromoiodide emulsion of the type described by Trivelli and Smith, Phot. Journal, vol. 79, 330 (1939) was prepared. To separate portions of the melted emulsion were added the individual representative dyes of my invention, each dissolved in an appropriate solvent, and then the tetrabenzylthiourea was added at 0.15 g./mole of silver halide from methanol solution. A control emulsion was prepared for each dye but without the tetrabenzylthiourea. Each portion of the emulsion was digested at 50° C. for 10 minutes and coated on a cellulose acetate film support. A strip of each coating was exposed on an intensity scale sensitometer with light modulated with a Wratten #15 filter, and then processed for 3 minutes in a developer having the formula:

| | G. |
|---|---|
| P-methylaminophenol sulfate | 2.0 |
| Sodium sulfite, desiccated | 90.0 |
| Hydroquinone | 8.0 |
| Sodium carbonate, monohydrated | 52.5 |
| Potassium bromide | 5.0 |
| Water to make 1 liter. | | followed by fixing in a conventional sodium thiosulfate fixing bath, washing and drying. From densitometric measurements of the developed images, the relative speed, fog and gamma values were determined. The relative speed values are inversely proportional to the exposure necessary to give a density of 0.3 above fog (density). The following table lists these data.

TABLE I

| Dye and conc. g./mole | Without tetrabenzylthiourea | | | With 0.15 g. of tetrabenzylthiourea per mole of silver halide | | |
|---|---|---|---|---|---|---|
| | Rel. speed | γ | Fog | Rel. speed | γ | Fog |
| 1 .045 | 100 | 1.72 | .07 | 195 | 1.38 | .06 |
| 2 .075 | 100 | 1.52 | .06 | 118 | 1.25 | .06 |
| 3 .030 | 100 | 1.32 | .10 | 191 | 1.60 | .09 |
| 4 .045 | 100 | 1.62 | .06 | 132 | 1.30 | .06 |
| 5 .025 | 100 | 2.08 | .07 | 166 | 1.90 | .07 |
| 6 .020 | 100 | 1.80 | .06 | 417 | 1.77 | .06 |
| 7 .025 | 100 | 1.94 | .06 | 575 | 2.06 | .06 |
| 8 .030 | 100 | 1.28 | .06 | 282 | 1.58 | .06 |
| 9 .080 | 100 | 1.26 | .11 | 347 | 2.46 | .08 |
| 10 .005 | 100 | 3.52 | .06 | 151 | 3.50 | .07 |
| 11 .041 | 100 | 1.92 | .06 | 159 | 1.93 | .06 |
| 12 .020 | 100 | 1.95 | .06 | 112 | 1.88 | .06 |
| 13 .041 | 100 | 1.91 | .10 | 115 | 1.88 | .07 |
| 14 .041 | 100 | 1.46 | .07 | 148 | 1.48 | .06 |
| 15 .040 | 100 | 2.06 | .07 | 145 | 1.98 | .06 |
| 16 .040 | 100 | 1.62 | .13 | 182 | 1.61 | .07 |
| 17 .040 | 100 | 2.30 | .06 | 145 | 1.62 | .07 |
| 18 .040 | 100 | 2.04 | .06 | 162 | 1.77 | .06 |
| 19 .040 | 100 | 2.00 | .06 | 123 | 1.75 | .06 |
| 20 .010 | 100 | 1.61 | .06 | 141 | 1.50 | .06 |
| 21 .030 | 100 | 2.86 | .08 | 162 | 3.12 | .10 |
| 22 .030 | 100 | 3.52 | .08 | 525 | 2.26 | .08 |
| 23 .015 | 100 | 2.20 | .08 | 214 | 2.68 | .08 |
| 24 .040 | 100 | 2.88 | .08 | 309 | 2.50 | .10 |
| 25 .040 | 100 | 3.08 | .08 | 347 | 2.34 | .09 |
| 26 .040 | 100 | 2.86 | .09 | 276 | 1.89 | .10 |
| 27 .015 | 100 | 3.44 | .10 | 214 | 2.80 | .09 |
| 28 .004 | 100 | 3.14 | .10 | 324 | 3.28 | .09 |
| 29 .004 | 100 | 3.62 | .08 | 436 | 3.34 | .08 |
| 30 .015 | 100 | 3.00 | .10 | 1100 | 2.58 | .08 |
| 31 .066 | 100 | 2.30 | .04 | 347 | 1.96 | .05 |
| 32 .066 | 100 | 2.44 | .05 | 776 | 2.20 | .05 |
| 33 .083 | 100 | 2.38 | .06 | 166 | 1.30 | .06 |
| 34 .066 | 100 | 2.48 | .09 | 380 | 2.46 | .06 |
| 35 .083 | 100 | 2.60 | .09 | 126 | 2.04 | .06 |
| 38 .066 | 100 | 1.45 | .06 | 276 | 1.57 | .05 |
| 39 .066 | 100 | 1.92 | .04 | 151 | 2.30 | .04 |
| 40 .066 | 100 | 0.55 | .07 | 661 | 1.64 | .06 |
| 41 .083 | 100 | 1.52 | .08 | 155 | 1.18 | .09 |
| 42 .050 | 100 | 1.53 | .08 | 166 | 1.10 | .36 |
| 43 .066 | 100 | 1.54 | .04 | 132 | 1.42 | .05 |
| 44 .066 | 100 | 1.07 | .04 | 126 | 1.40 | .04 |
| 46 .020 | 100 | 0.98 | .04 | 575 | 0.82 | .04 |
| 47 .010 | 100 | 1.10 | .04 | 145 | 0.92 | .04 |
| 48 .043 | 100 | 1.21 | .04 | 112 | 0.94 | .04 |
| 49 .043 | 100 | 1.28 | .03 | 145 | 0.77 | .03 |
| 50 .066 | 100 | 1.32 | .06 | 276 | 1.01 | .04 |
| 51 .066 | 100 | 1.14 | .06 | 224 | 0.89 | .04 |
| 52 .033 | 100 | 1.23 | .04 | 347 | 1.37 | .04 |

In every instance the emulsion containing my supersensitizing combinations had substantially higher relative speeds than the corresponding emulsion containing no tetrabenzylthiourea. Speed increases of up to 11 times the control emulsion speeds are shown.

The following example illustrates the method used to determine the optimum amount of tetrabenzylthiourea to use in my supersensitizing combination.

Example 2

A simple gelatino-silver bromoiodide emulsion was made as in Example 1. This was divided into 3 portions and the indicated amount of Dye 1 and tetrabenzylthiourea were added to these portions which were then digested, coated, exposed and processed as described in Example 1. The relative speeds, gamma and fog values are tabulated as follows:

TABLE II

| Dye and supersensitizer conc., g./mole of silver halide | Rel. Speed | γ | Fog |
|---|---|---|---|
| 1 (.045) | 100 | 1.80 | .06 |
| 1 (.045)+A¹ (.03) | 110 | 1.62 | .06 |
| 1 (.045)+A¹ (.150) | 214 | 1.71 | .06 |

¹ A represents tetrabenzylthiourea.

These results show that about 0.150 g. of tetrabenzylthiourea per mole of silver halide in this particular emulsion with Dye 1 gives optimum supersensitization.

The following example illustrates typical high speed silver bromoiodide emulsions containing my supersensitizing combinations.

Example 3

Example 1 was repeated but with a high speed gelatino-silver bromoiodide emulsion containing my dyes 36, 37 and 38 with and without tetrabenzylthiourea. The resulting relative speed, gamma and fog values obtained are given below.

TABLE III

| Dye and conc. g./mole | Without tetrabenzylthiourea | | | With 0.15 g. of tetrabenzylthiourea per mole of silver halide | | |
|---|---|---|---|---|---|---|
| | Rel. speed | γ | Fog | Rel. speed | γ | Fog |
| 36 .030 | 100 | 1.41 | .25 | 151 | 0.45 | .07 |
| 37 .030 | 100 | 1.40 | .18 | 224 | 1.14 | .07 |
| 38 .004 | 100 | 1.38 | .09 | 148 | 1.04 | .05 |

Example 4

Example 1 was repeated using the dyes and substituted thioureas (supersensitizers) indicated in Table IV. Each emulsion coating was exposed on an intensity scale sensitometer with light modulated with a Wratten #16 filter instead of the #15 filter used in Example 1.

TABLE IV

| Dye and supersensitizer conc., g./mole of silver halide | Rel. Speed | γ | Fog |
|---|---|---|---|
| 36 (0.053) | 100 | 1.20 | 0.06 |
| 36 (0.053)+B (0.15) | 123 | 0.84 | 0.06 |
| 36 (0.053)+C (0.15) | 503 | 0.89 | 0.04 |
| 36 (0.053)+D (0.15) | 603 | 0.86 | 0.04 |
| 1 (0.053) | 100 | 1.28 | 0.06 |
| 1 (0.053)+C (0.15) | 135 | 1.23 | 0.05 |
| 36 (0.053) | 100 | 1.04 | 0.04 |
| 36 (0.053)+E (0.15) | 229 | 0.81 | 0.05 |
| 36 (0.053)+F (0.15) | 229 | 0.78 | 0.04 |
| 36 (0.053) | 100 | 1.19 | 0.04 |
| 36 (0.053)+G (0.15) | 331 | 1.19 | 0.06 |
| 36 (0.053)+H (0.15) | 398 | 1.14 | 0.06 |
| 46 (0.053) | 100 | 1.01 | 0.04 |
| 46 (0.053)+I (0.15) | 166 | 0.70 | 0.04 |

In every instance the emulsion containing my supersensitizing combinations had substantially higher relative speeds than the corresponding emulsion containing no substituted thiourea. Relative speed increases up to 6 times the control are shown.

Example 5

Example 1 was repeated using the dyes and substituted thioureas (supersensitizers) indicated in Table V. Each emulsion coating was exposed on an intensity scale sensitometer with light modulated with a Wratten #16 filter instead of the #15 used in Example 1.

TABLE V

| Dye and supersensitizer conc., g./mole of silver halide | Rel. Speed | γ | Fog |
|---|---|---|---|
| 36 (0.053) | 100 | 1.12 | .04 |
| 36 (0.053)+A (0.072) | 415 | .72 | .04 |
| 36 (0.053)+J (0.072) | 220 | .91 | .04 |
| 53 (0.053) | 100 | 1.02 | .06 |
| 53 (0.053)+K (0.072) | 125 | .61 | .05 |
| 53 (0.053)+J (0.072) | 280 | 1.16 | .28 |

The dyes used in my supersensitizing combinations are known. Numerous references are known showing the preparation of carbocyanine, dicarbocyanine, tricarbocyanine and azacarbocyanine dyes. Complex cyanine dyes, for example, are described in patents, such as 2,388,963, 2,430,295, 2,440,119, 2,442,710, 2,454,629, 2,504,468, 2,535,982, 2,535,993, 2,656,351, etc.

Dyes, such as, dye No. 5 are prepared to advantage by reacting approximately equimolar amounts of 2,4,5-trimethylpyrylium salt and 3-ethyl-2-ethylthiobenzothiazolium ethyl sulfate. The product of this reaction is reacted with an equimolar amount of 2-ethyl-2-ethylthiobenzothiazolium ethyl sulfate to produce the dye.

Dyes, such as dye No. 5 are prepared to advantage by by reacting equimolar amounts of 2,4,6-trimethyl pyrylium salt and 2-(2-acetanilidovinyl)-3-ethylbenzothiazolium iodide. The product of this reaction is then reacted with 3-ethyl-2-ethylthiobenzothiazolium ethyl sulfate to give the dye.

The compounds of Formula II are known and are readily prepared by methods known in the art. Many of the compounds are available.

The invention has been described in detail with particular reference to preferred embodiments thereof, but it will be understood that variations and modifications can be effected within the spirit and scope of the invention and described hereinabove and as defined in the appended claims.

I claim:

1. A light-sensitive layer containing silver halide grains containing:

(1) a dye selected from the class consisting of (a) a cyanine dye having the formula:

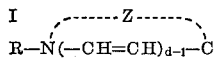
$$R-N(-CH=CH)_{d-1}-C(=L-L')_{n-1}[=A]_{p-1}=L^2(-L^3=L^4)_{x-1}(-L^5=L^6)_{y-1}-C(=CH-CH)_{j-1}=N-R'X^{\ominus}$$

wherein R represents an alkyl group; R' represents an alkyl group; d represents an integer of from 1 to 2; n represents an integer of from 1 to 3; p represents an integer of from 1 to 2; x represents an integer of from 1 to 2; y represents an integer of from 1 to 2; j represents an integer of from 1 to 2; L, L², L⁴ and L⁶ each represents a member selected from the class consisting of a methine group and the nitrogen atom such that not more than one of the said L groups represents the nitrogen atom; L' and L⁵ each represents the =CH— group and L³ represents the =CH— group or the =CR³— group where R³ is β-indolyl; A represents a heterocyclic nucleus selected from the class consisting of a 4-thiazolidinone nucleus, a 4-imidazolidinone nucleus, a 2-imidazolin-4-one nucleus, a 4-oxazolidinone nucleus, the 1,3-dithiolan-4-one nucleus, the imidazo[1,2-a]pyridinone nucleus, and X⁻ represents an acid anion; Z and Z' each represents the non-metallic atoms necessary to complete a nucleus containing a heterocyclic ring having from 5 to 6 atoms in the said ring; and (b) an unquaternized form of said cyanine dye; and (2) a substituted thiourea in which at least one of the hydrogen atoms on each nitrogen atom of the thiourea molecule is replaced by a substituent and at least one of the substituents on the said molecule contains an aromatic ring.

2. A light-sensitive layer of claim 1 in which the substituted thiourea has the formula:

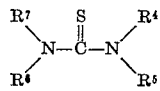

wherein R⁴ and R⁶ each represents a member selected from the class consisting of hydrogen, a lower alkyl group, an aralkyl group and an aryl group; R⁵ and R⁷ each represents a member selected from the class consisting of a lower alkyl group, an aralkyl group and an aryl group, such that at least one of the groups R⁴, R⁵, R⁶ and R⁷ contains an aryl ring.

3. A light-sensitive layer of claim 1 in which the substituted thiourea is tetrabenzylthiourea.

4. A light-sensitive layer of claim 1 in which the substituted thiourea is N,N-diethyl-N',N'-diphenylthiourea.

5. A light-sensitive layer of claim 1 in which the substituted thiourea is N,N,N'-tribenzyl-N-phenylthiourea.

6. A light-sensitive layer of claim 1 in which the substituted thiourea is N,N,dibenzyl-N,N'-diphenylthiourea.

7. A light-sensitive layer of claim 1 in which the substituted thiourea is N,N-dibenzyl-N'-ethyl-N'-phenylthiourea.

8. A light-sensitive layer of claim 1 in which the substituted thiourea is N-benzyl-N',N'-diethyl-N-phenylthiourea.

9. A light-sensitive layer of claim 1 in which the substituted thiourea is N-ethyl-N,N',N'-triphenylthiourea.

10. A light-sensitive layer of claim 1 in which the substituted thiourea is tetraphenylthiourea.

11. A light-sensitive layer of claim 1 in which the substituted thiourea is N-methyl-N'-phenethylthiourea.

12. A light-sensitive layer containing silver halide grains containing:

(1) a dye selected from the class consisting of (a) a cyanine dye having the formula:

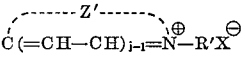
$$R-N(-CH=CH)_{d-1}-C(=L-L')_{n-1}[=A]_{p-1}=L^2(-L^3=L^4)_{x-1}(-L^5=L^6)_{y-2}-C(=CH-CH)_{j-1}=N-R'X^{\ominus}$$

wherein R represents an alkyl group; R' represents an alkyl group; d represents an integer of from 1 to 2; n represents an integer of from 1 to 3; p represents an integer of from 1 to 2; x represents an integer of from 1 to 2; y represents an integer of from 1 to 2; j represents an integer of from 1 to 2; L, L², L⁴ and L⁶ each represents a member selected from the class consisting of a methine group and the nitrogen atom such that not more than one of the said L groups represents the nitrogen atom; L', and L⁵ each represents the =CH— group and L³ represents the =CH— group or the =CR³— ground where R³ is β-indolyl; A represents a heterocyclic nucleus selected from the class consisting of a 4-thiazolidinone nucleus, a 4-imidazolidinone nucleus, a 2-imidazolidinone nucleus, a 2-imidazoline-4-one nucleus, a 4-oxazolidinone nucleus, the 1,3-dithiolan-4-one nucleus, the imidazo[,1,2a]pyridinone nucleus, and X⁻ represents an acid anion; Z and Z' each represents the non-metallic atoms necessary to complete a 5 to 6 membered heterocyclic nucleus selected from the class consisting of a thiazole nucleus, a benzothiazole nucleus, a napththothiazole nucleus, a 6,7,8,9-tetrahydronaphthothiazole nucleus, an oxazole nucleus, a benzoxazole nucleus, a naphthoazole nucleus, a selenazole nucleus, a benzoselenazole nucleus, a naphthoselenazole nucleus, a thiazoline nucleus, a 2-quanoline nucleus, a 4-quinoline nucleus, a 1-isoquinoline nucleus, a 2-pyridine nucleus, a 4-pyridine nucleus, an imidazole nucleus, a benzimidazole nucleus, a naphthimidazole nucleus, a 3,3-dialkyl(3H)indole nucleus and a tetrazole nucleus; and (b) an unquaternated form of said cyanine dye; and (2) a substituted thiourea having the formula:

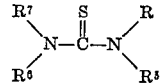

wherein R⁴ and R⁶ each represents a member selected from the class consisting of hydrogen, a lower alkyl group, an aralkyl group and an alkyl group; R⁵ and R⁷ each represents a member selected from the class consisting of a lower alkyl group, an aralkyl group and an aryl group, such that at least one of the groups R⁴, R⁵, R⁶ and R⁷ contains an aryl ring.

13. A photographic hydrophilic colloid silver halide emulsion layer containing a supersensitizing combination of:

(1) a dye selected from the class consisting of a cyanine dye and an unquaternized form of said cyanine dye, said dye having a conjugated chain containing at least three atoms in the chain selected from the class consisting of carbon and nitrogen such that not more than one of said atoms in the chain is nitrogen and such that the said chain contains an odd number of from 3 to 11 carbon atoms, said conjugated chain terminating at each end in basic heterocyclic nuclei having from 5 to 6 atoms in the heterocyclic ring selected from the class consisting of a thiazole nucleus, a benzothiazole nucleus, a naphthothiazole nucleus, a 6,7,8,9-tetrahydronaphthothiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 4-quinoline nucleus, a 1-isoquinoline nucleus, a 2-pyridine nucleus, a 4-pyridine nucleus, an imidazole nucleus, a benzimidazole nucleus, a napthimidazole nucleus, a 3,3-dialkyl-(3H)indole nucleus and a tetrazole nucleus, and (2) a substituted thiourea in which at least one of the hydrogen atoms on each nitrogen atom of the thiourea molecule is replaced by a hydrocarbon substituent and at least one of the substituents on the said molecule contains an aromatic ring.

14. An emulsion layer of claim 13 in which the hydrophilic colloid is gelatin.

15. A light-sensitive gelatino silver halide emulsion containing a supersensitizing combination of tetrabenzyl-thio urea and 3,3'-diethyl-4,5; 4',5'-dibenzothiadicarbocyanine iodide.

16. A light-sensitive gelatino silver halide emulsion containing a supersensitizing combination of tetrabenzyl-thio urea and 3,3'-dimethylthio-8-azadicarbocyanine iodide.

17. A light-sensitive gelatino silver halide emulsion containing a supersensitizing combination of tetrabenzyl-thio urea and anhydro-2-[(2-benzothiazolyl etho hydroxide)methylene]-5-[(3 - ethyl-2(3H)-benzothiazolylidine)-ethylidene]-3-(3-sulfobutyl)-4-thiazolidin-one.

18. A light-sensitive gelatino silver halide emulsion containing N,N,N'-tribenzyl-N'-phenylthiourea and 3,3'-diethyloxathiadicarbocyanine iodide.

19. A light-sensitive gelatino silver halide emulsion containing N,N'-dibenzyl-N,N'-diphenylthiourea and 3,3'-diethyloxathiadicarbocyanine.

References Cited
UNITED STATES PATENTS

| | | | |
|---|---|---|---|
| 3,287,136 | 11/1966 | McBride | 96—106 |
| 3,155,514 | 11/1964 | Blake | 96—107 |
| 3,364,032 | 1/1968 | Jones | 96—107 |

J. TRAVIS BROWN, Primary Examiner.

U.S. Cl. X.R.

96—105, 106

PO-1050
(5/69)

UNITED STATES PATENT OFFICE
CERTIFICATE OF CORRECTION

Patent No. 3,458,318            Dated July 29, 1969

Inventor(s) Dugald A. Brooks

It is certified that error appears in the above-identified patent and that said Letters Patent are hereby corrected as shown below:

Column 10, lines 20-25, in the structural formula, that part of the structure that reads "$(-L^5=L^6)_{y-2}-$" should read -- $(-L^5=L^6)_{y-1}-$ --;

line 38 delete the word "ground" and insert in its place ---group---; line 53, delete the term "2-quanoline" and insert in its place ---2-quinoline---; and in lines 60 through 64, in the structural formula, that part of the structure that reads "$-N{<}^{R}_{R^5}$" should read "$-N{<}^{R^4}_{R^5}$".

SIGNED AND
SEALED
MAY 12 1970

(SEAL)
Attest:

Edward M. Fletcher, Jr.
Attesting Officer

WILLIAM E. SCHUYLER, JR.
Commissioner of Patents